(12) United States Patent
Yamauchi

(10) Patent No.: US 12,460,954 B2
(45) Date of Patent: Nov. 4, 2025

(54) RECOGNITION APPARATUS, RECOGNITION METHOD, AND NON-TRANSITORY COMPUTER-READABLE STORAGE MEDIUM

(71) Applicant: KABUSHIKI KAISHA TOSHIBA, Tokyo (JP)

(72) Inventor: Yasunobu Yamauchi, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 303 days.

(21) Appl. No.: 17/823,531

(22) Filed: Aug. 31, 2022

(65) Prior Publication Data

US 2023/0236047 A1 Jul. 27, 2023

(30) Foreign Application Priority Data

Jan. 25, 2022 (JP) ................. 2022-009531

(51) Int. Cl.
*G01D 21/02* (2006.01)
*G06V 10/44* (2022.01)
(Continued)

(52) U.S. Cl.
CPC .......... *G01D 21/02* (2013.01); *G06V 10/443* (2022.01); *G06V 10/764* (2022.01); *G06V 10/806* (2022.01)

(58) Field of Classification Search
CPC .... G01D 21/02; G06V 10/443; G06V 10/764; G06V 10/806; G06V 10/454;
(Continued)

(56) References Cited

U.S. PATENT DOCUMENTS

| 2012/0041575 A1* | 2/2012 | Maeda | G05B 23/024 |
| | | | 700/79 |
| 2015/0160098 A1* | 6/2015 | Noda | G01M 99/00 |
| | | | 702/35 |

(Continued)

FOREIGN PATENT DOCUMENTS

| JP | 2016-115226 A | 6/2016 |
| JP | 2020-190960 A | 11/2020 |

(Continued)

OTHER PUBLICATIONS

F. Wang et al., "Residual Attention Network for Image Classification," ICVR 2017, pp. 3156-3164 (2017).

(Continued)

*Primary Examiner* — Mohammad K Islam
(74) *Attorney, Agent, or Firm* — Finnegan, Henderson, Farabow, Garrett & Dunner, LLP

(57) ABSTRACT

According to one embodiment, a recognition apparatus includes processing circuitry. The processing circuitry generates a first feature quantity exhibiting a feature of sensor data based on the sensor data, converts the first feature quantity into a second feature quantity exhibiting a feature contributing to identification of a class of the sensor data, generates a significant feature quantity exhibiting a feature that is significant in the identification of the class based on a cross-correlation between the first feature quantity and the second feature quantity, generates an integrated feature quantity considering features of the first feature quantity and the second feature quantity, based on the second feature quantity and the significant feature quantity, and identifies the class based on the integrated feature quantity.

20 Claims, 8 Drawing Sheets

(51) Int. Cl.
*G06V 10/764* (2022.01)
*G06V 10/80* (2022.01)

(58) Field of Classification Search
CPC ........ G06V 10/82; G06V 20/52; G06V 40/20;
G06V 10/25; G06V 10/431; G06V 10/60;
G06V 10/62; G06V 10/761; G06V
10/762; G06V 10/80; G06V 10/803;
G06V 10/84; G06V 10/85; G06V 10/993;
G06V 20/00; G06V 20/10; G06V 20/20;
G06V 20/41; G06V 20/44; G06V 20/46;
G06V 20/47; G06V 20/49; G06V 40/113;
G06V 40/165; G06V 40/23; G06V 40/28;
G06N 3/0442; G06N 3/045; G06N
3/0464; G06N 3/084; G06N 3/08; G06N
20/00; G06N 20/20; G06N 3/04; G06N
3/063; G06N 5/01; G06N 20/10; G06N
3/044; G06N 3/047; G06N 3/048; G06N
7/01; G06N 3/082; G06N 5/046; A61B
5/1103; A61B 5/1113; A61B 5/398; A61B
5/6802; A61B 5/7267; A61B 2562/0219;
A61B 5/1123; A61B 5/7264; A61B
5/1118; A61B 2503/20; A61B 2562/0204;
G06F 17/15; G06F 18/214; G06F 18/22;
G06F 18/24; G06F 18/2413; G06F
18/2431; G06F 2218/12; G06F 11/3024;
G06F 11/3447; G06F 12/084; G06F
16/285; G06F 16/583; G06F 16/9537;
G06F 18/2155; G06F 18/2163; G06F
18/23; G06F 18/2321; G06F 18/24133;
G06F 18/2414; G06F 18/25; G06F
18/285; G06F 18/29; G06F 18/295; G06F
21/6245; G06F 2218/08; G06F 2218/10;
G06F 3/011; G06F 3/017; G06F 3/0346;
G06F 3/04883; G06F 7/5443
See application file for complete search history.

(56) References Cited

U.S. PATENT DOCUMENTS

| | | | | |
|---|---|---|---|---|
| 2018/0000385 | A1* | 1/2018 | Heaton | G08B 25/016 |
| 2020/0372324 | A1 | 11/2020 | Yamauchi et al. | |
| 2020/0397345 | A1* | 12/2020 | Golestani | A61B 5/1118 |
| 2022/0012502 | A1* | 1/2022 | Klinkigt | G06V 20/41 |
| 2022/0138536 | A1* | 5/2022 | Li | G06N 3/045 |
| | | | | 706/25 |
| 2022/0249906 | A1* | 8/2022 | Phillips | G06N 3/045 |
| 2023/0072423 | A1* | 3/2023 | Osborn | G16H 20/30 |
| 2023/0135244 | A1* | 5/2023 | Machado | G06N 3/09 |
| | | | | 704/232 |

FOREIGN PATENT DOCUMENTS

| | | |
|---|---|---|
| JP | 2021-22368 A | 2/2021 |
| WO | WO 2017/065241 A1 | 4/2017 |
| WO | WO 2018/163555 A1 | 9/2018 |
| WO | WO 2021/130888 A1 | 7/2021 |
| WO | WO 2021/130995 A1 | 7/2021 |

OTHER PUBLICATIONS

R.R. Selvaraju et al., "Grad-CAM: Visual Explanations from Deep Networks via Gradient-based Localization," ICCV 2017, arXiv: 1610.02391v4 [cs.CV], 23 pages (2019).
V.S. Murahari et al., "On Attention Models for Human Activity Recognition," ISWC 2018, arXiv:1805.07648v1 [cs.CV], 4 pages (2018).
S. Liu et al., "GlobalFusion:A Global Attentional Deep Learning Framework for Multisensor Information Fusion," Proc. ACM Interact. Mob. Wearable Ubiquitous Technol., vol. 4, No. 1, Article 19, 27 pages (2020).
Tsuyoshi Ikegaya et al., "Cooking Behavior Recognition based on First Person Vision for Cognitive Function Automatic Evaluation System," Inf. Proc. Soc. of Japan SIG Technical Report, vol. 2017-MBL-82, No. 22, 8 pages (2017).
Japan Patent Office, Office Action in JP App. No. 2022-009531, 3 pages, and machine translation, 2 pages (Jan. 7, 2025).

* cited by examiner

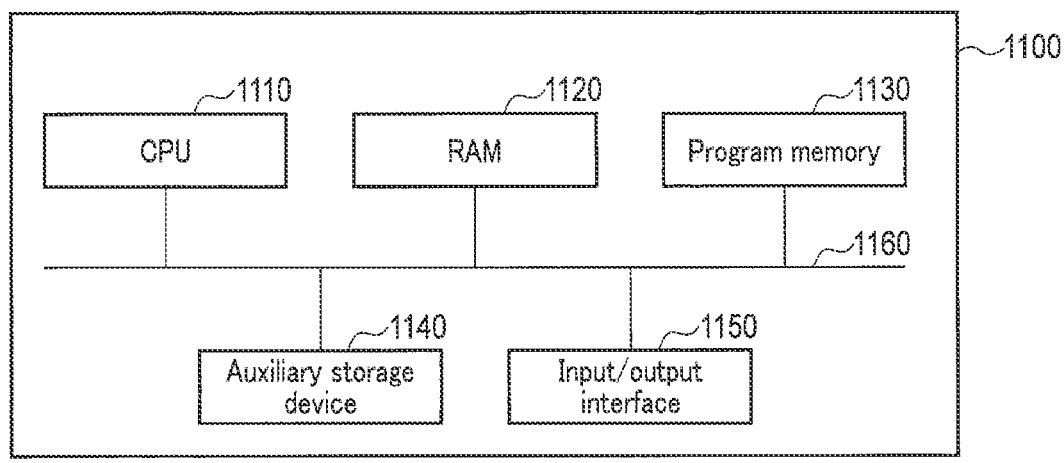
F I G. 11

RECOGNITION APPARATUS, RECOGNITION METHOD, AND NON-TRANSITORY COMPUTER-READABLE STORAGE MEDIUM

CROSS-REFERENCE TO RELATED APPLICATION

This application is based upon and claims the benefit of priority from Japanese Patent Application No. 2022-009531, filed Jan. 25, 2022, the entire contents of which are incorporated herein by reference.

FIELD

Embodiments described herein relate generally to a recognition apparatus, a recognition method, and a non-transitory computer-readable storage medium.

BACKGROUND

In recent years, with advancements in processor and sensor performance, and reductions in their size and power consumptions, inexpensive wearable devices have become accessible, and healthcare services keeping a log (life log) of daily physical activities are actively being promoted. Movement for expanding their use to the field of social infrastructures is also accelerating. For example, in a work place such as those of manufacturing, logistics, and inspections, there has been a known technology for acquiring physical activities of workers with sensors, such as those in wearable devices, and recognizing working behaviors of the workers, from the sensor data using a neural network.

As such a technology, for example, there is a technology for identifying such a behavior by processing feature quantities extracted from sensor data with attention information generated based on the degrees by which such feature quantities contribute to class identification. However, with this technology, the degrees of contributions to class identification do not reflect features unique to specific types of sensor data, because the same values are shared among the entire sensor data.

BRIEF DESCRIPTION OF THE DRAWINGS

FIG. 11 is a block diagram illustrating a hardware configuration of a computer according to an embodiment.

DETAILED DESCRIPTION

In general, according to one embodiment, a recognition apparatus includes processing circuitry. The processing circuitry generates a first feature quantity exhibiting a feature of sensor data based on the sensor data, converts the first feature quantity into a second feature quantity exhibiting a feature contributing to identification of a class of the sensor data, generates a significant feature quantity exhibiting a feature that is significant in the identification of the class based on a cross-correlation between the first feature quantity and the second feature quantity, generates an integrated feature quantity considering features of the first feature quantity and the second feature quantity, based on the second feature quantity and the significant feature quantity, and identifies the class based on the integrated feature quantity.

Some embodiments of a recognition apparatus will now be explained in detail with reference to some drawings.

First Embodiment

Figure 1:
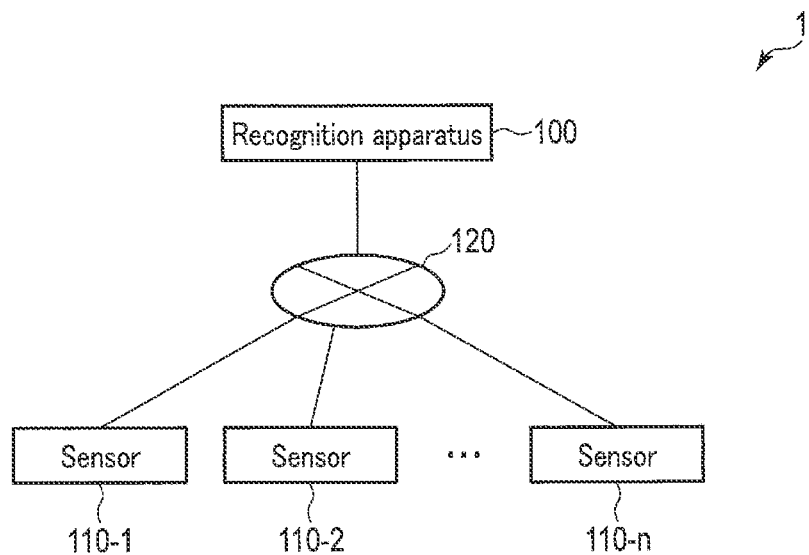
FIG. 1 is a block diagram illustrating a configuration example of a recognition system including a recognition apparatus according to a first embodiment.

FIG. 1 is a block diagram illustrating a configuration example of a recognition system 1 including a recognition apparatus 100 according to a first embodiment. The recognition system 1 illustrated in FIG. 1 includes a recognition apparatus 100 and one or more sensors. In FIG. 1, sensors 110-1, 110-2, . . . , and 110-*n* are illustrated as one or more sensors. The recognition apparatus 100 and the sensors 110-1, 110-2, . . . , and 110-*n* are connected via a network 120. A communication scheme used by the network 120 may be a wired scheme or a wireless scheme. The communication scheme may be a combination of a wired scheme and a wireless scheme. Hereinafter, each of the sensors 110-1, 110-2, . . . , and 110-*n* will be simply referred to as a sensor 110 in a case where these sensors are not to be distinguished from one another.

The sensor 110 acquires sensor data such as that representing information concerning an object to be recognized, and transmits the sensor data to the recognition apparatus 100. The sensor data is, for example, acceleration data, angular velocity data, geomagnetic data, atmospheric pressure data, temperature and humidity data, body temperature data, myoelectric potential data, and pulse wave data. The sensor 110 is a wearable sensor, for example. In a case where the sensor 110 is worn by a worker, an example of the information of the object to be recognized includes information related to an activity of the sensor wearer (activity information).

Note that the sensor 110 may be an imaging device attached to the worker, or an imaging device that captures images of the worker. In a case where the sensor 110 is an imaging device, examples of the sensor data include an image and three-dimensional skeleton data.

In estimating (recognizing) an activity of the person wearing the wearable sensor, the movements and the works to be recognized differ and are diverse depending on the types of environment such as factories, fields, home, office, and fitness. In the description herein, work environments grouped by the types of work (work type) are referred to as a work domain. It can be assumed that, in a work domain such as factories, examples of main and common actions are "moving a carriage", "transporting", "operating touch panels", "writing", and "operating switches". In a logistics location such as a warehouse, tasks such as "reading barcodes", "picking", "packing", and "operating a forklift", as well as "transporting" goods are the main types of works. When a training model is to be reused among different work domains, it is necessary to support different types works depending on the work domain. In addition, it is also necessary to take the differences in sensor configurations into consideration. For example, considering to prioritize the recognition precision, sensors may be attached to a plurality of body parts, e.g., the feet and the torso, in addition to the sensor worn on the arm.

Figure 2:
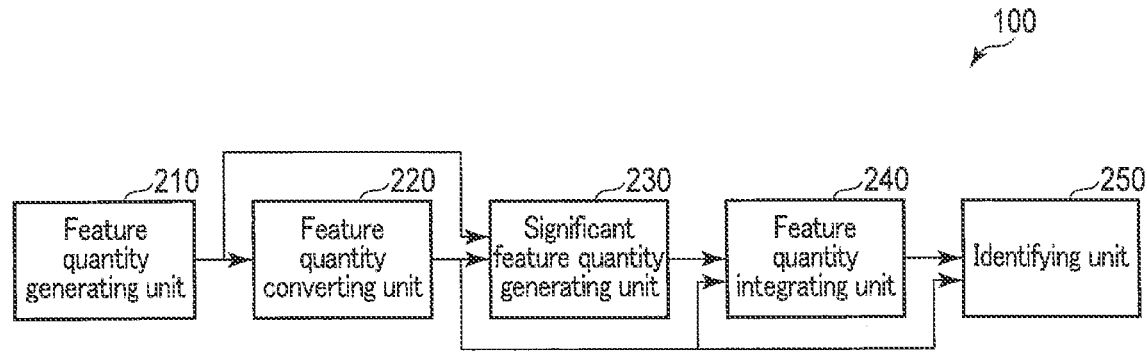
FIG. 2 is a block diagram illustrating a configuration example of the recognition apparatus according to the first embodiment.

FIG. 2 is a block diagram illustrating a configuration example of the recognition apparatus 100 according to the first embodiment. The recognition apparatus 100 in FIG. 2 acquires sensor data from the sensor 110, and recognizes information of an object to be recognized (such as activity information of a person) from the acquired sensor data. The recognition apparatus 100 includes a feature quantity generating unit 210, a feature quantity converting unit 220, a significant feature quantity generating unit 230, a feature quantity integrating unit 240, and an identifying unit 250.

The feature quantity generating unit 210 generates a first feature quantity exhibiting g a feature of sensor data based on the sensor data acquired from the sensor 110. The feature quantity generating unit 210 outputs the first feature quantity to the feature quantity converting unit 220 and the significant feature quantity generating unit 230.

The feature quantity converting unit 220 receives the first feature quantity from the feature quantity generating unit 210. The feature quantity converting unit 220 converts the first feature quantity into a second feature quantity exhibiting a feature that contributes to the identification of the class of the sensor data. Specifically, the feature quantity converting unit 220 generates a second feature quantity by activating a feature quantity to be focused in the first feature quantity, the feature quantity to be focused being that to be focused in class identification. The feature quantity converting unit 220 outputs the second feature quantity to the significant feature quantity generating unit 230, the feature quantity integrating unit 240, and the identifying unit 250. Note that the class mentioned above will be described later.

The significant feature quantity generating unit 230 receives the first feature quantity from the feature quantity generating unit 210 and receives the second feature quantity from the feature quantity converting unit 220. The significant feature quantity generating unit 230 generates a significant feature quantity exhibiting a feature that is significant in class identification, based on cross-correlation between the first feature quantity and the second feature quantity. Specifically, the significant feature quantity generating unit 230 calculates a cross-correlation value between the first feature quantity and the second feature quantity, and generates a significant feature quantity that is significant in class identification. The significant feature quantity also has a high correlation with a signal feature of the sensor data.

The feature quantity integrating unit 240 receives the second feature quantity from the feature quantity converting unit 220, and receives the significant feature quantity from the significant feature quantity generating unit 230. The feature quantity integrating unit 240 generates integrated feature quantity taking the features in the first feature quantity and the second feature quantity into consideration, based on the second feature quantity and the significant feature quantity. Specifically, the feature quantity integrating unit 240 adds or multiplies the significant feature quantity and the second feature quantity, to generate an integrated feature quantity. The feature quantity integrating unit 240 outputs the integrated feature quantity to the identifying unit 250.

The identifying unit 250 receives the integrated feature quantity from the feature quantity integrating unit 240. The identifying unit 250 identifies the class based on the integrated feature quantity. Specifically, the identifying unit 250 identifies the class of the sensor data corresponding to the integrated feature quantity using a neural network that outputs a class by receiving an input of an integrated feature quantity.

Alternatively, the identifying unit 250 may identify the class based on the second feature quantity. Specifically, the identifying unit 250 receives the second feature quantity from the feature quantity converting unit 220. The identifying unit 250 identifies the class of the sensor data corresponding to the second feature quantity using a neural network that outputs a class by receiving an input of the second feature quantity.

The class to be identified by the identifying unit 250 may be defined in any way. The class is, for example, an activity, a work type, or an action. Specifically, examples of the classes identified in a work domain such as a factory include "moving a carriage", "transporting", "operating touch panels", "writing", and "operating switches", for example. In this manner, the identifying unit 250 can identify the activity of a sensor wearer.

The result of identifying the class by the identifying unit 250 may be displayed on a display or the like, not illustrated in FIGS. 1 and 2, stored in a storage device, or transmitted to another device connected wirelessly or over the wire.

The configurations of the recognition apparatus 100 and the recognition system 1 according to the first embodiment have been explained above. A network model corresponding to the recognition apparatus 100 according to the first embodiment will now be explained.

Figure 3:
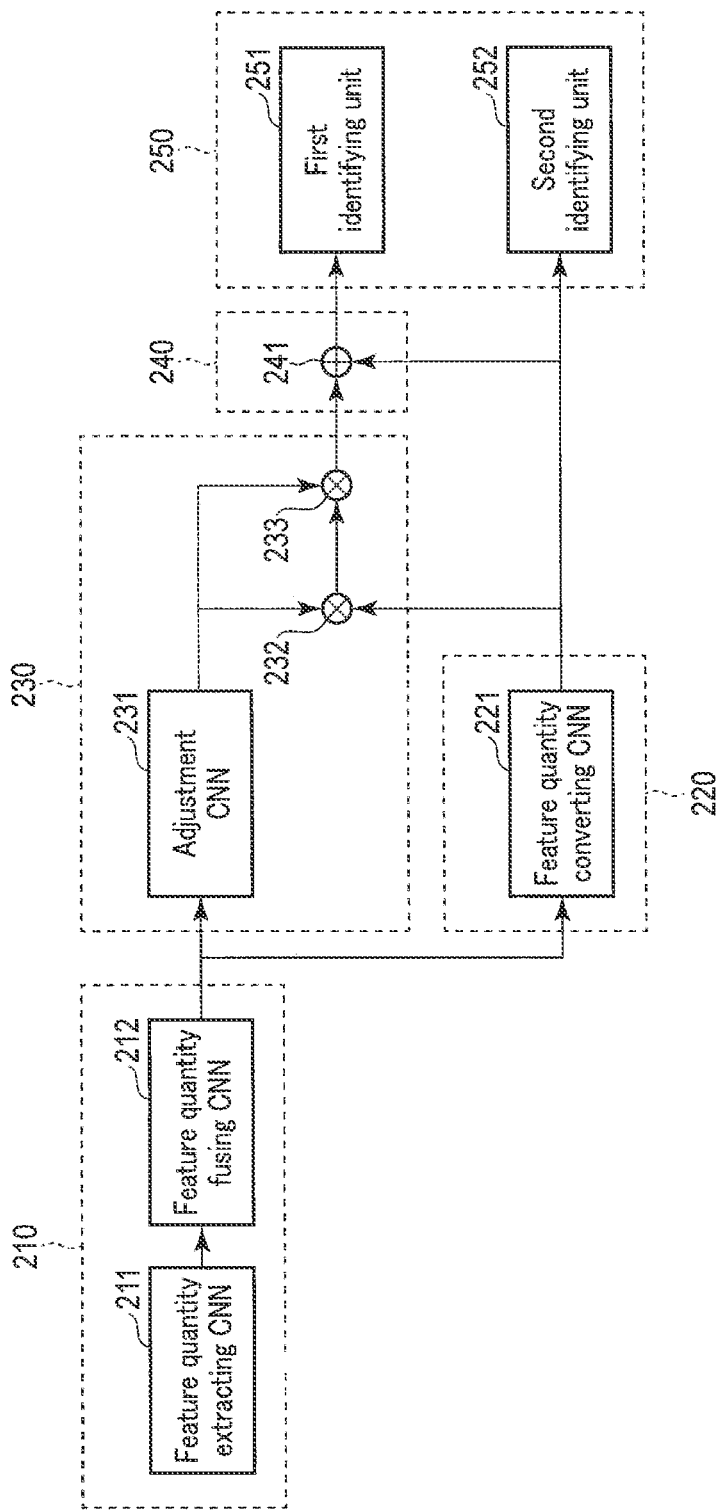
FIG. 3 is a block diagram illustrating a configuration example of a network model corresponding to the recognition apparatus according to the first embodiment.

FIG. 3 is a block diagram illustrating a configuration example of a network model corresponding to the recognition apparatus 100 according to the first embodiment. The network model illustrated in FIG. 3 is an example of an embodiment of the units included in the recognition apparatus 100 illustrated in FIG. 2. Each of such units included in the recognition apparatus 100 in FIG. 2 will now be explained specifically.

To begin with, the sensor data input to the recognition apparatus 100 will be explained. The input sensor data is time-series data acquired at a sampling interval of the sensor 110, and is data that is a summary of pieces of time-series data each piece of which is data included in a specific interval (where an interval is defined by a predetermined number of samplings), the summary being a summary over a predetermined number of the intervals. Therefore, a unit in which the sensor data is processed by the recognition apparatus 100 is sensor data that is continuous over time and defined by a predetermined number of intervals.

The sensor data included in the interval may also be time-series sensor values, or may be frequency feature quantities (signal intensities at respective frequencies) obtained by converting the time-series sensor values into the frequency domain, using an algorithm such as fast Fourier transform (FFT). For example, a plurality of sensors may acquire time-series data at their respective different sampling intervals. In such a case, sensor data with different sampling intervals need to be handled in an integrated manner. Therefore, in the description below, it is assumed that the sensor data is a frequency feature quantity resultant of applying frequency conversion using FFT.

The feature quantity generating unit 210 includes one or more neural networks (NNs). As the NNs, convolutional neural networks (CNNs) are used, for example. Specifically, the feature quantity generating unit 210 includes a feature quantity extracting CNN 211 and a feature quantity fusing CNN 212.

The feature quantity extracting CNN 211 is a CNN for extracting a feature quantity. The feature quantity extracting CNN 211 has, for example, input layers in a number corresponding to the number of pieces of sensor data. The feature quantity extracting CNN 211 outputs a feature quantity for each piece of sensor data. Hereinafter, it is assumed that pieces of data are acquired from three respective types of modalities (e.g., an accelerometer, an angular velocity meter, and a geomagnetic meter) corresponding to three sensors that are worn at different body parts, respectively.

The feature quantity fusing CNN 212 is a CNN for fusing feature quantities. The feature quantity fusing CNN 212 fuses a plurality of feature quantities output from the feature quantity extracting CNN 211. Fusing of the feature quantities includes, for example, fusing with respect to a sensor modality and fusing with respect to a sensor-wearing body part. In the fusing with respect to a sensor modality, for example, pieces of sensor data from sensors worn at different body parts but having the same modality are fused. With this fusing, the sensor signal features unique to a sensor modality can be extracted efficiently. In addition, in the fusing with respect to a sensor-wearing body part, for example, pieces of sensor data from sensors having different modalities but worn at the same body part are fused. With this fusing, the sensor signal features unique to a body part where the sensor is worn can be extracted efficiently.

Note that it is possible to perform both of the fusing with respect to a sensor modality and fusing with respect to a sensor-wearing body part described above. With this fusing, the sensor signal features unique to a sensor modality as well as a sensor-wearing body part can be extracted efficiently.

The feature quantity converting unit 220 includes one or more NNs. For example, a CNN is used as the NN. Specifically, the feature quantity converting unit 220 includes a feature quantity converting CNN 221.

The feature quantity converting CNN 221 is a CNN for converting a feature quantity. The feature quantity converting CNN 221 includes, for example, a convolution layer in which the number of output filters is set to the number of classes to be identified, using a kernel with a size of 1×1. The convolution layer used herein is configured to activate the feature of a class assigned to that filter. The feature quantity converting CNN 221 generates a second feature quantity by passing a first feature quantity through the convolution layer. Therefore, the second feature quantity may be referred to as a class activation map (CAM).

In summary, the feature quantity converting unit 220 converts a first feature quantity into a second feature quantity that the class assigned to the filter is activated.

The significant feature quantity generating unit 230 includes one or more NNs. For example, a CNN is used as the NN. Specifically, the significant feature quantity generating unit 230 includes an adjustment CNN 231, a first multiplier unit 232, and a second multiplier unit 233.

The adjustment CNN 231 is a CNN for adjusting a feature quantity. The adjustment CNN 231 includes, for example, a convolution layer in which the number of output filters is set to the number of classes to be identified, using a kernel with a size of 1×1. The convolution layer used herein is configured to activate a feature of sensor data. The number of filters output from the adjustment CNN 231 is the same as the number of filters output from the feature quantity converting CNN 221. The adjustment CNN 231 generates a generic feature quantity by passing the first feature quantity through the convolution layer. Therefore, the generic feature quantity has the same number of filters as the second feature quantity.

The first multiplier unit 232 generates a feature quantity significance by multiplying the generic feature quantity and the second feature quantity. Specifically, in a case where a generic feature quantity and a second feature quantity are represented by matrices of the same size, the first multiplier unit 232 generates a feature quantity significance by obtaining a matrix product between the generic feature quantity and the transposed matrix of the second feature quantity, and applying a softmax function in units of a filter.

The second multiplier unit 233 generates a significant feature quantity by multiplying a generic feature quantity and a feature quantity significance. Specifically, in a case where the generic feature quantity and the feature quantity significance are represented by matrices of the same size, the second multiplier unit 233 generates a significant feature quantity by obtaining a matrix product between the transposed matrix of the generic feature quantity and the feature quantity significance.

In summary, the significant feature quantity generating unit 230 generates a significant feature quantity exhibiting a feature that is significant in class identification, based on the cross-correlation between the first feature quantity and the second feature quantity.

The feature quantity integrating unit 240 includes an adder unit 241. The adder unit 241 generates an integrated feature quantity by adding the second feature quantity and the significant feature quantity.

The identifying unit 250 includes an identifying unit corresponding to each type of feature quantities to be identified. Specifically, the identifying unit 250 includes a first identifying unit 251 and a second identifying unit 252.

The first identifying unit 251 identifies the class of an object to be recognized based on the integrated feature quantity. Specifically, the first identifying unit 251 includes a recurrent neural network (RNN) such as a long short-term memory (LSTM) and a gated recurrent unit (GRU), and a softmax layer that applies a softmax function. The first identifying unit 251 implements a neural network that outputs a class by receiving an input of an integrated feature quantity, using the RNN and the softmax layer. The result of the identification performed in the first identifying unit 251 reflects training data in units of the time. Note that the output data from the softmax layer may be referred to as a class identification likelihood.

The second identifying unit 252 identifies the class of the object to be recognized based on the second feature quantity. Specifically, the second identifying unit 252 includes a global average pooling (GAP) layer and a softmax layer. The second identifying unit 252 implements a neural network that outputs a class by receiving an input of a second feature quantity, using the GAP layer and the softmax layer. The result of the identification performed by the second identifying unit 252 reflects the entire training data. Note that the output data from the softmax layer may be referred to as a class identification likelihood.

The configuration of the network model corresponding to the recognition apparatus 100 according to the first embodiment has been described above. Specific examples in which this network model is used will now be explained. In a first specific example, the feature quantity significance will be explained to be calculated using a two-dimensional feature element as a unit, and in a second specific example, the feature quantity significance will be explained to be calculated using a three-dimensional feature element as a unit.

Figure 4:
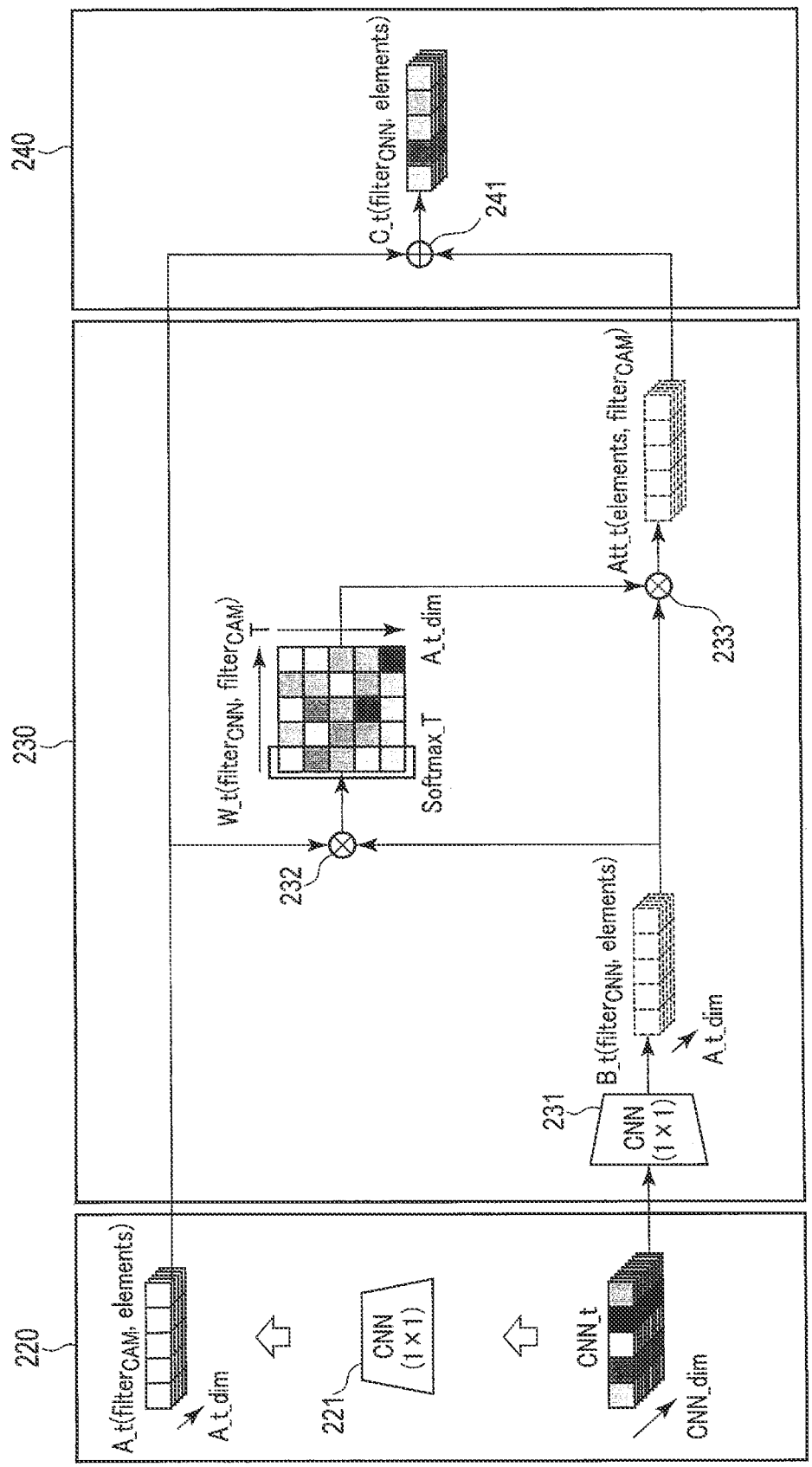
FIG. 4 is a schematic for explaining a first specific example using the network model illustrated in FIG. 3.

FIG. 4 is a schematic for explaining a first specific example using the network model illustrated in FIG. 3. FIG. 4 illustrates network models (the feature quantity converting CNN 221, the adjustment CNN 231, the first multiplier unit 232, the second multiplier unit 233, and the adder unit 241) associated with the feature quantity converting unit 220, the significant feature quantity generating unit 230, and the feature quantity integrating unit 240, respectively, and intermediate generation data (the first feature quantity, the second feature quantity, the generic feature quantity, the feature quantity significance, the significant feature quantity, and the integrated feature quantity). It is assumed that handled in FIG. 4 are pieces of sensor data having their feature quantities fused with respect to their sensor modality.

The feature quantity converting unit 220 receives a first feature quantity CNN_t from the feature quantity generating unit 210, not illustrated. The first feature quantity CNN_t is resultant of fusing the pieces of sensor data with respect to the sensor modality. Therefore, the feature elements of the first feature quantity CNN_t are time, sensor modality, and frequency features.

Upon receiving an input of the first feature quantity CNN_t, the feature quantity converting CNN 221 outputs a second feature quantity A_t (filter$_{CAM}$, elements) with filters in a number set to the number of classes to be identified.

The significant feature quantity generating unit 230 receives the first feature quantity CNN_t from the feature quantity generating unit 210, not illustrated, and receives the second feature quantity A_t (filter$_{CAM}$, elements) from the feature quantity converting unit 220.

Upon receiving the input of the first feature quantity CNN_t, the adjustment CNN 231 outputs a generic feature quantity B_t (filter$_{CNN}$, elements). At this time, the number of filters of the generic feature quantity B_t (filter$_{CNN}$, elements) is adjusted to be the same as the number of filters of the second feature quantity A_t (filter$_{CAM}$, elements).

The first multiplier unit 232 multiplies the generic feature quantity B_t (filter$_{CNN}$, elements) with the second feature quantity A_t (filter$_{CAM}$, elements) to generate a feature quantity significance W_t (filter$_{CNN}$, filter$_{CAM}$). Specifically, the feature quantity significance W_t (filter$_{CNN}$, filter$_{CAM}$) is expressed by following formula (1).

$$W\_t = \mathrm{Softmax}(B\_t\ \mathrm{transpose}(A\_t)) \quad (1)$$

Where Softmax ( ) represents a softmax function, and transpose ( ) represents a transposition. According to above formula (1), the first multiplier unit 232 applies the softmax function to the matrix product of the generic feature quantities B_t and the transposed matrix of the second feature quantities A_t correspondingly to each filter, to generate a feature quantity significance W_t corresponding to each filter. Note that, in FIG. 4, because the feature quantity significance W_t is generated in units of time, the feature quantity significance W_t includes two-dimensional feature elements (sensor modality and frequency feature).

The second multiplier unit 233 generates the significant feature quantity Att_t (filter$_{CNN}$, elements) by multiplying the generic feature quantity B_t (filter$_{CNN}$, filter$_{CAM}$) with the feature quantity significance W_t (elements, filter$_{CAM}$). Specifically, the significant feature quantity Att_t (elements, filter$_{CAM}$) is expressed by following formula (2).

$$Att\_t = \mathrm{transpose}(B\_t)A\_t \quad (2)$$

According to above formula (2), the second multiplier unit 233 obtains the matrix product of the transposed matrix of the generic feature quantities B_t, and the feature quantity significance W_t, to generate the significant feature quantity Att_t.

In summary, the significant feature quantity generating unit 230 generates a significant feature quantity exhibiting a feature that is significant in class identification, based on the cross-correlation between the first feature quantity and the second feature quantity.

The feature quantity integrating unit 240 receives the second feature quantity A_t (filter$_{CAM}$, elements) from the feature quantity converting unit 220, and receives the significant feature quantity Att_t (elements, filter$_{CAM}$) from the significant feature quantity generating unit 230.

The adder unit 241 generates an integrated feature quantity C_t (filter$_{CAM}$, elements) by adding the second feature quantity A_t (elements, filter$_{CAM}$) and the significant feature quantity Att_t (filter$_{CNN}$, elements). Specifically, the integrated feature quantities C_t (filter$_{CNN}$, elements) are expressed by formula (3).

$$C\_t = A\_t + \mathrm{transpose}(Att\_t) \quad (3)$$

According to above formula (3), the adder unit 241 obtains the sum of the second feature quantity A_t and the transposed matrix of the significant feature quantity Att_t, to generate the integrated feature quantities C_t.

Figure 5:
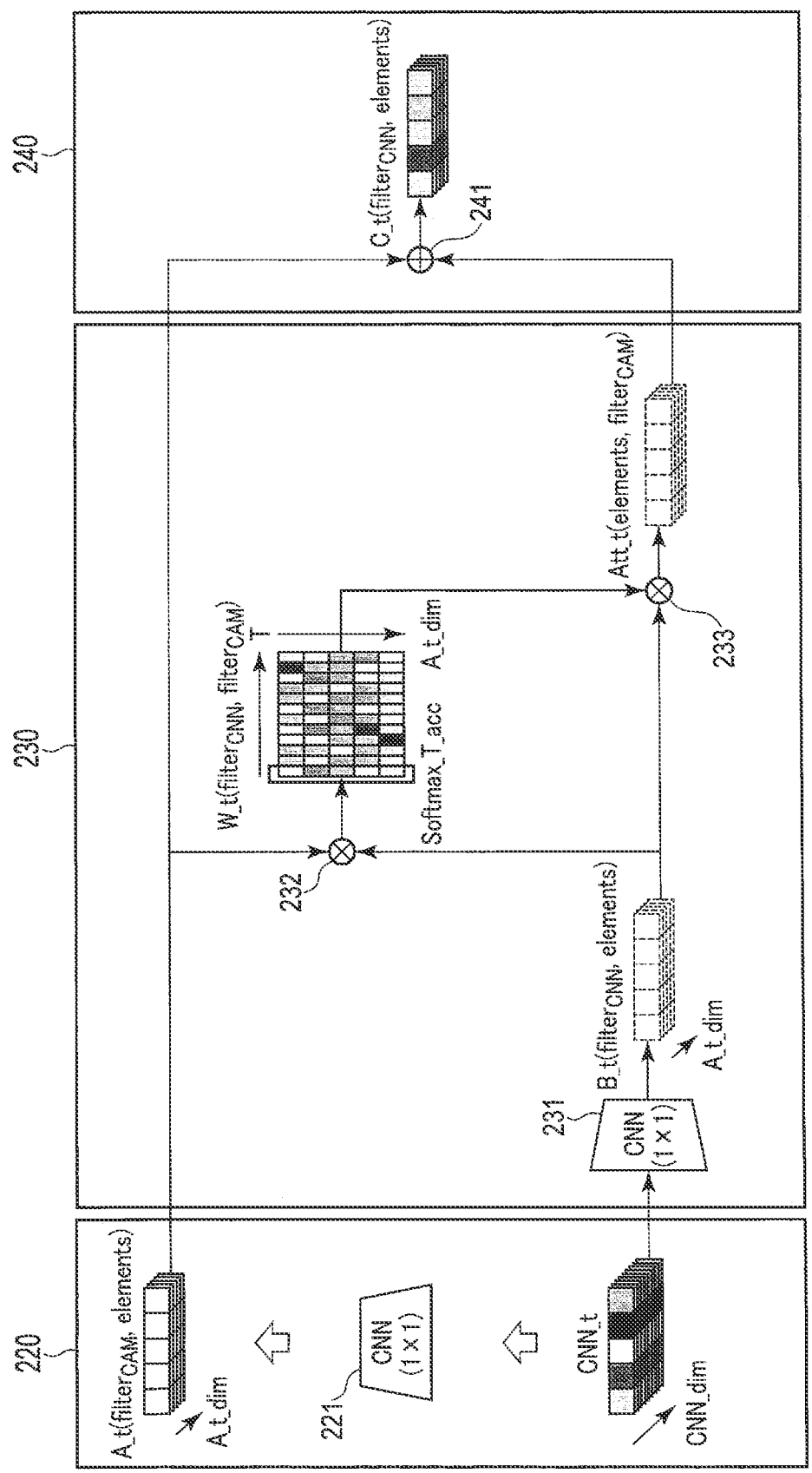
FIG. 5 is a schematic for explaining a second specific example using the network model illustrated in FIG. 3.

FIG. 5 is a schematic for explaining a second specific example using the network model illustrated in FIG. 3. In the same manner as FIG. 4, FIG. 5 illustrates network models associated with the feature quantity converting unit 220, the significant feature quantity generating unit 230, and the feature quantity integrating unit 240, respectively, and the intermediate generation data (the first feature quantity, second feature quantity, the generic feature quantity, the feature quantity significance, significant feature quantity, and the integrated feature quantity).

The second specific example in FIG. 5 is different from the first specific example in FIG. 4 in that the time is included as a feature element in the calculation of the feature quantity significance. In other words, in FIG. 5, the feature quantity significance W_t includes a three-dimensional feature element (time, sensor modality, and frequency features). In a case where the time is included as a feature element, in the part of the explanation of FIG. 4 where the integration of the feature elements or the like is performed correspondingly to each unit of the time, the feature quantity significance and the integrated feature quantity are generated, correspondingly to each filter, at once, with the time included as a feature element.

Note that only the frequency feature may be included as the feature element used in calculating the feature quantity significance. In a case where only the frequency feature is included as the feature element, the feature quantity related to the time and the feature quantity related to the sensor modality are separated, and the feature quantity significance and the integrated feature quantity are generated respectively and separately.

In the example explained above, pieces of sensor data having their feature quantities subjected to fusing related to the sensor modality are processed, but the present invention is not limited thereto. For example, pieces of sensor data having their feature quantities fused with respect to a sensor-wearing body part may also be processed. If the feature quantities are fused with respect to a sensor-wearing body part, for example, the sensor-wearing body part and the frequency feature are included as feature elements. Furthermore, if pieces of sensor data have their feature quantities subjected to both of the fusing with respect to their sensor modality and fusing with respect to the sensor-wearing body part, for example, the sensor modality, the sensor-wearing body part, and the frequency feature are included as feature elements.

The specific examples using the network model corresponding to the recognition apparatus 100 according to the first embodiment have been described above. An operation of the recognition apparatus 100 will now be explained with reference to the flowchart illustrated in FIG. 6.

Figure 6:
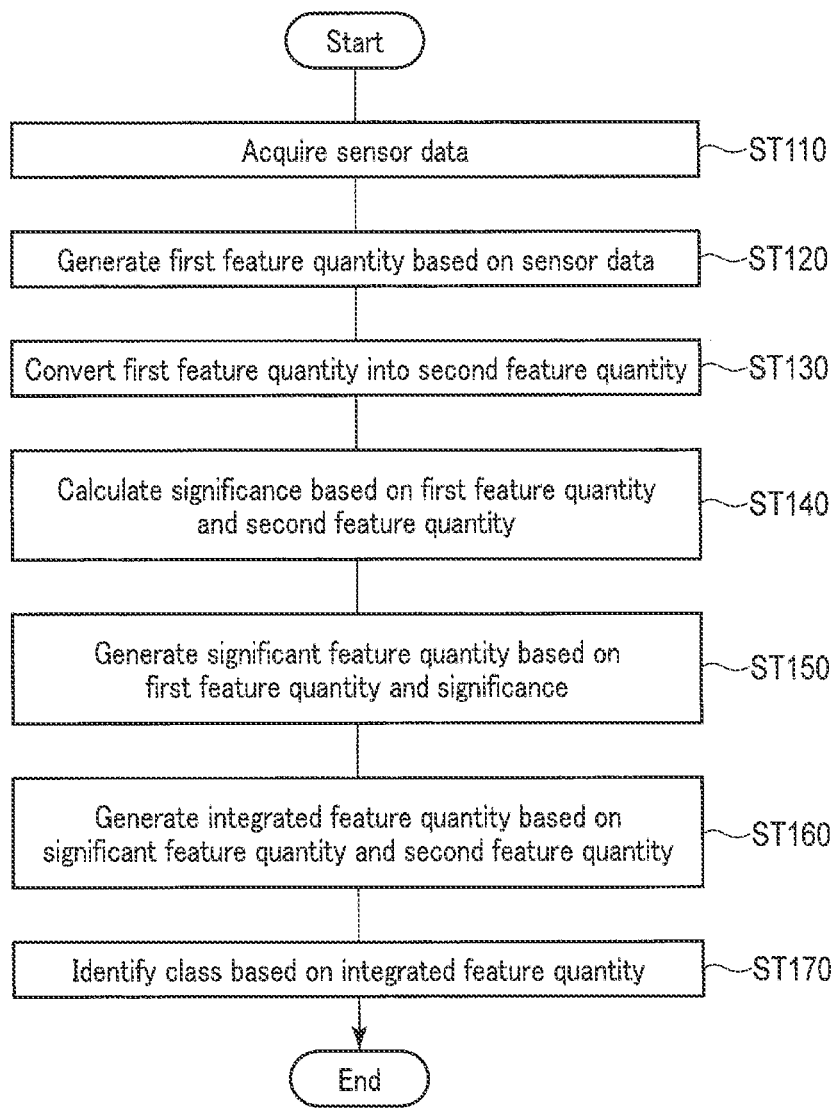
FIG. 6 is a flowchart illustrating an operation example of the recognition apparatus according to the first embodiment.

FIG. 6 is a flowchart illustrating an operation example of the recognition apparatus 100 according to the first embodiment. The flowchart of FIG. 6 illustrates the sequence from when sensor data is input to when the class identification result is output, for example.

(Step ST110)

The recognition apparatus 100 acquires sensor data from the sensor 110.

(Step ST120)

After the sensor data is acquired, the feature quantity generating unit 210 generates a first feature quantity based on the sensor data.

(Step ST130)

After generating the first feature quantity, the feature quantity converting unit 220 converts the first feature quantity into the second feature quantity.

(Step ST140)

After the first feature quantity is converted into the second feature quantity, the significant feature quantity generating unit 230 calculates a significance based on the first feature quantity and the second feature quantity.

(Step ST150)

After the significance is calculated, the significant feature quantity generating unit 230 generates a significant feature quantity based on the first feature quantity and the significance.

(Step ST160)

After the significant feature quantity is generated, the feature quantity integrating unit 240 generates an integrated feature quantity based on the significant feature quantity and the second feature quantity.

(Step ST170)

After generating the integrated feature quantity, the identifying unit 250 identifies the class based on the integrated feature quantity.

As described above, the recognition apparatus according to the first embodiment generates a first feature quantity exhibiting a feature of sensor data based on the sensor data, converts the first feature quantity into a second feature quantity exhibiting a feature contributing to the identification of the class of the sensor data, generates a significant feature quantity exhibiting a feature that is significant in the identification of the class based on the cross-correlation between the first feature quantity and the second feature quantity, generates an integrated feature quantity taking the features of the first feature quantity and the second feature quantity into consideration, based on the second feature quantity and the significant feature quantity, respectively, and identifies a class based on the integrated feature quantity.

Therefore, the recognition apparatus according to the first embodiment can improve the identification precision of the neural networks used in identifying a class, by taking both of the feature of the sensor data and the feature of the class identification into consideration.

For example, the recognition apparatus according to the first embodiment may combine sensor data from a plurality of sensors having different modalities. Specifically, the sensor data may be a combination of the same images having been sensed at different frequency bands, e.g., a visible light image and an infrared image. With such a combination, in order to detect a human body, for example, the recognition apparatus integrates feature quantities so as to emphasize an infrared image and suppress a visible light image.

Furthermore, the combination of different sensor data may be, for example, time-series sensor signals output from an inertial sensor and acoustic signals acquired with a microphone. For example, the recognition apparatus acquires sound signals at a workplace from a microphone worn on the head or an arm of a worker, or a microphone installed in a machining tool, and at the same time, acquires sensor signals resultant of the motions of the worker, using an inertial sensor worn on an arm or a wrist of the worker. As a result, the recognition apparatus can receive not only an input of motion during the work but also acoustic information at the workplace as sensor data simultaneously, and then integrate feature quantities focusing on the work-specific acoustic signals (e.g, acoustic signals emitted from a machining tool). In this manner, it is possible to achieve an effect of improving the precision at which an action is recognized.

Furthermore, the combination of different sensor data may be a combination of signals output from a biological sensor, such as an electro-oculography sensor or a myoelectric sensor, and signals output from an inertial sensor. With this, it is possible to acquire eye movement, blinking, and muscle contraction activities, and to improve the recognition precision using unique sensor information, which cannot be obtained by an inertial sensor, as a clue.

Second Embodiment

In the example explained in the first embodiment, the recognition apparatus identifies a class from the sensor data using a network model. Explained in a second embodiment is how the network model is switched in a case where a condition for identifying a class is changed.

Figure 7:
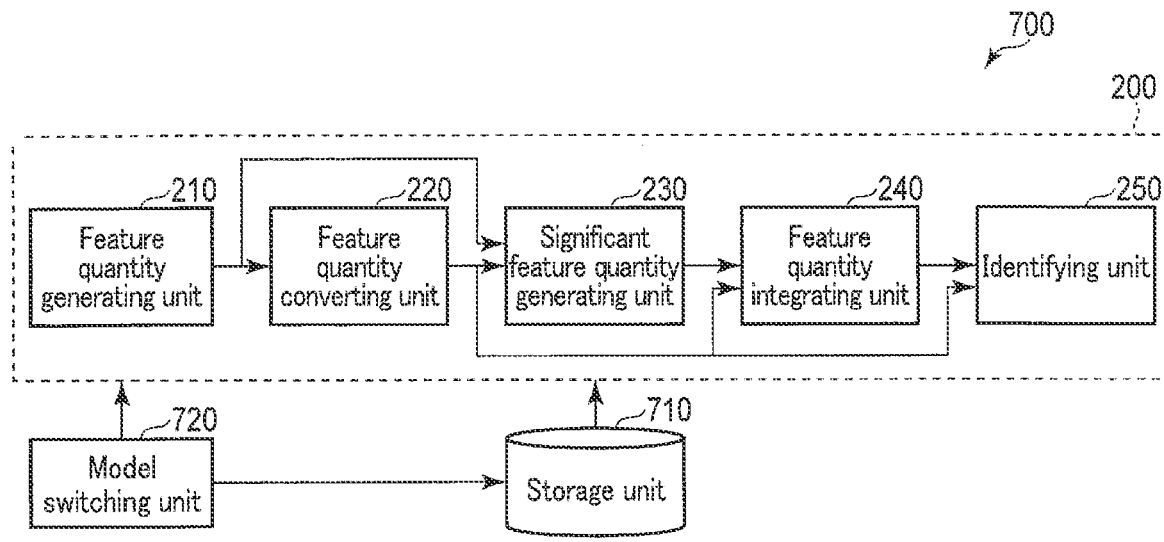
FIG. 7 is a block diagram illustrating a configuration example of a recognition apparatus according to a second embodiment.

FIG. 7 is a block diagram illustrating a configuration example of a recognition apparatus 700 according to a second embodiment. The recognition apparatus 700 illustrated in FIG. 7 includes a feature quantity generating unit 210, a feature quantity converting unit 220, a significant feature quantity generating unit 230, a feature quantity integrating unit 240, an identifying unit 250, a storage unit 710 (memory), and a model switching unit 720. Note that, hereinafter, the feature quantity generating unit 210, the feature quantity converting unit 220, the significant feature quantity generating unit 230, the feature quantity integrating unit 240, and the identifying unit 250 are collectively referred to as an identifying model 200.

The storage unit 710 stores therein information regarding a network model used in the identifying model 200. For example, the storage unit 710 stores therein a work domain and a network model in a manner associated to each other. The storage unit 710 also stores therein, for example, a sensor modality or a sensor-wearing body part and a network model in a manner associated with one another. The storage unit 710 also stores therein, for example, a worker and a parameter of the network model in a manner associated to each other.

The model switching unit 720 switches a network model for the identifying model 200, based on model switching data including information concerning the network model for the identifying model. The information concerning the network model includes, for example, information about a work domain, information about a sensor modality corresponding to the input sensor data or a sensor-wearing body part, and information about a worker.

Note that switching of the network model includes not only switching of the network model itself but also switching of the parameters of the network model. Therefore, the model switching unit 720 switches at least one of the network model and a parameter of the network model.

Figure 8:
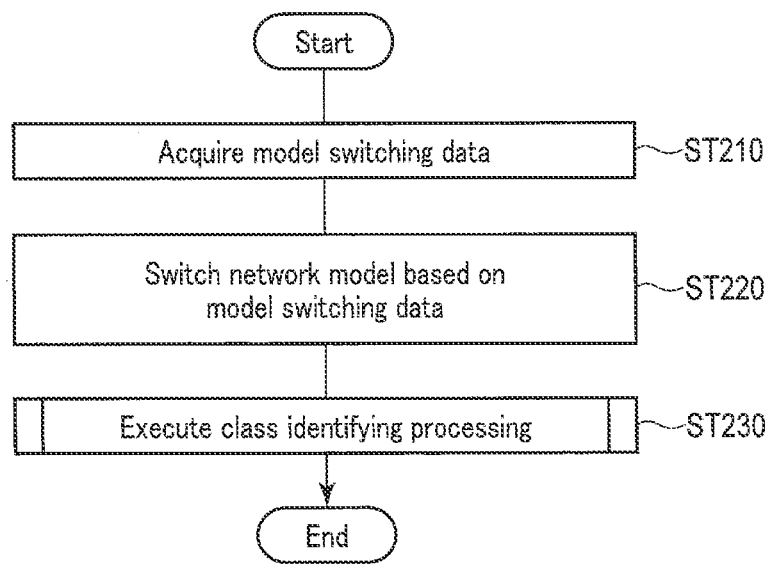
FIG. 8 is a flowchart illustrating an operation example of the recognition apparatus according to the second embodiment.

FIG. 8 is a flowchart illustrating an operation example of the recognition apparatus 700 according to the second embodiment. The flowchart of FIG. 8 includes model switching processing and class identifying processing. Note that the class identifying processing is the same as the sequence of the processing illustrated in the flowchart of FIG. 6, and therefore, an explanation thereof will be omitted.
(Step ST210)
The recognition apparatus 700 acquires model switching data.
(Step ST220)
After the model switching data is acquired, the model switching unit 720 switches the network model based on the model switching data. Specifically, the model switching unit 720 reads the network model associated with the information about the network model included in the model switching data from the storage unit 710, and switches the network model for the identifying model 200.
(Step ST230)
After the network model is switched, the recognition apparatus 700 executes the class identifying processing using the switched network model.

As described above, the recognition apparatus according to the second embodiment can switch at least one of the network model and a parameter of the network model.

Therefore, the recognition apparatus according to the second embodiment can perform appropriate recognition processing in accordance with various conditions by switching the network model or a parameter of the network model based on the sensor data.

For example, with the recognition apparatus according to the second embodiment, a neural network identifying model can be switched when the model is to be applied in different work domains, e.g., a work domain of a factory and a work domain of a logistics location. In addition, in a case where a configuration of the sensor is changed although the work domain remains the same (e.g., in a case where a different sensor modality or sensor wearing body part is used, or in a case where a new sensor is added subsequently), by switching the neural network identifying model, the recognition apparatus can perform the recognition processing flexibly using the same system configuration.

Third Embodiment

Explained in the first embodiment and the second embodiment are examples in which the recognition apparatus identifies a class from the sensor data using network models that have been trained in advance. Explained now in a third embodiment by contrast is to train a network model in a case where a condition of class identification or sensor data to be recognized is changed.

Figure 9:
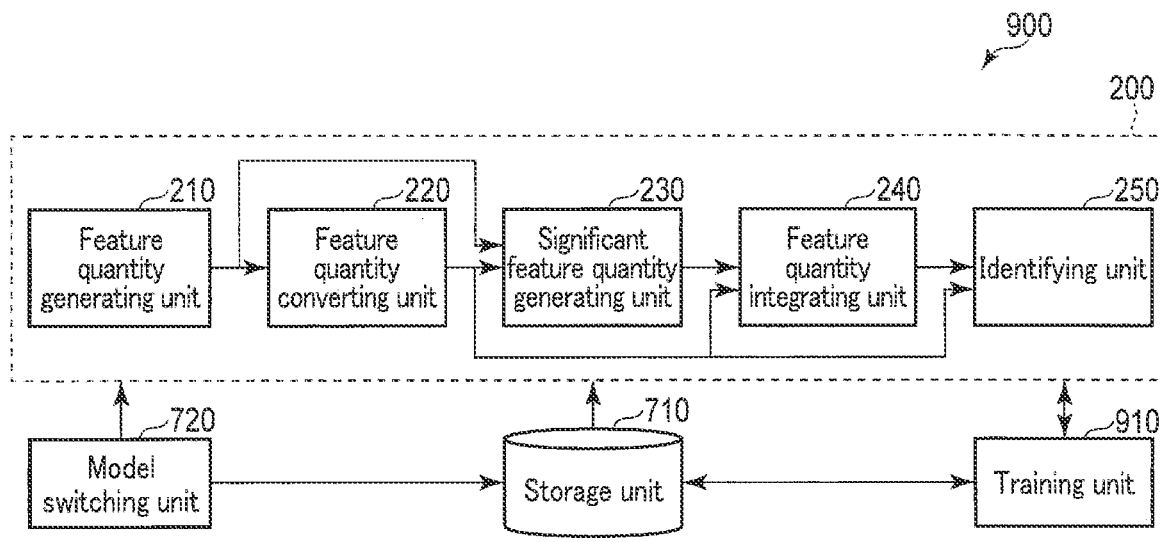
FIG. 9 is a block diagram illustrating a configuration example of a recognition apparatus according to a third embodiment.

FIG. 9 is a block diagram illustrating a configuration example of a recognition apparatus 900 according to a third embodiment. The recognition apparatus 900 in FIG. 9 includes an identifying model 200, a storage unit 710, a model switching unit 720, and a training unit 910.

The training unit 910 trains a network model using a training data set in which sensor data is associated with a piece of corresponding class data serving as a correct answer (correct answer data). The training unit 910 reflects the result of training the network model as a model parameter of the identifying model 200. The training unit 910 may also store the training result in the storage unit 710.

The storage unit 710 illustrated in FIG. 9 also stores therein a training data set used by the training unit 910. The storage unit 710 may also store therein the result of training performed by the training unit 910.

Figure 10:
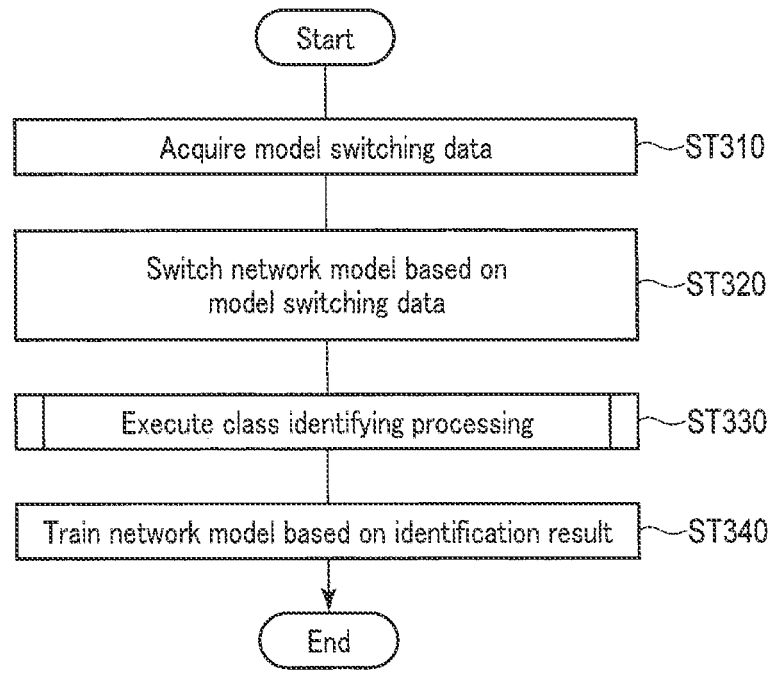
FIG. 10 is a flowchart illustrating an operation example of the recognition apparatus according to the third embodiment.

FIG. 10 is a flowchart illustrating an operation example of the recognition apparatus 900 according to the third embodiment. The flowchart illustrated in FIG. 10 includes model switching processing, class identifying processing, and training processing. Note that the model switching processing and the class identifying processing are the same as the sequence of processing illustrated in the flowchart of FIG. 8, and therefore detailed explanations thereof will be omitted.
(Step ST310)
The recognition apparatus 700 acquires model switching data.
(Step ST320)
After the model switching data is acquired, the model switching unit 720 switches the network model based on the model switching data. It is assumed herein that to be trained is the network model having been switched.
(Step ST330)
After the network model is switched, the recognition apparatus 900 executes the class identifying processing. To train the network model, the recognition apparatus 900 executes the class identifying processing using sensor data included in the training data set.
(Step ST340)
After the class identifying processing is executed, the training unit 910 trains the network model based on the identification result. Specifically, the training unit 910 updates the model parameters of the network model in such a manner that an error between the identification result and the correct answer data becomes 0. More specifically, the training unit 910 calculates a cross entropy error between the identification result and the correct answer data, and updates the model parameter based on back propagation.

In a case where the identifying unit 250 includes two networks (the first identifying unit 251 and the second identifying unit 252), as illustrated in FIG. 3, the output from each of the two networks is a distribution corresponding to a class identification likelihood (class identification likelihood distribution). Therefore, in addition to the cross entropy error, the training unit 910 may handle a distribution distance between the class identification likelihood distributions corresponding to the two respective networks as a loss function of the networks.

The distance between the distributions of the two class identification likelihoods may be calculated using the Kullback-Leibler divergence, for example, but the present invention is not limited thereto. When P denotes a distribution output from the network performing class identification using second feature quantities, when Q denotes a distribution output from the network performing class identification using integrated feature quantities, and i denotes a target class variable, the Kullback-Leibler divergence $D_{KL}$ in these distributions can be obtained as in following formula (4).

$$D_{KL}(P\|Q)=\Sigma_i P(i)\log Q(i)/P(i) \quad (4)$$

Therefore, the training unit 910 may train the neural network model in such a manner that the distribution of class identification likelihoods output based on second feature quantities becomes equal to the distribution of the class identification likelihoods output based on integrated feature quantities. With this configuration, by storing past identification results in the storage unit 710, the identifying unit 250 may also use the past identification results over a certain time period to correct the current identification result. For example, the identifying unit 250 may output the most frequent identification result recorded over a past certain period. In this manner, it is possible to avoid a temporary change in the recognition results by being affected by some errors in the sensor values or the like, and to build a recognition system that is robust against noise factors such as errors in the sensors.

As described above, the recognition apparatus according to the third embodiment can train a neural network model.

Therefore, by training the neural network model, the recognition apparatus according to the third embodiment can perform appropriate recognition processing even in a new environment.

For example, according to the recognition apparatus according to the third embodiment, in a case where a subject worker is added or changed although the work domain remains the same, it is possible to train and update the network model by feeding a small amount of sensor data and a correct answer class to the network model. As a result, it is possible to develop a recognition system adapted to workers, and it is possible to develop a recognition system that is more flexible and robust against noise.

(Hardware Configuration)

FIG. 11 is a block diagram illustrating a hardware configuration of a computer according to an embodiment. This computer 1100 includes, as hardware, a central processing unit (CPU) 1110, a random access memory (RAM) 1120, a program memory 1130, an auxiliary storage device 1140, and an input/output interface 1150. The CPU 1110 communicates with the RAM 1120, the program memory 1130, the auxiliary storage device 1140, and the input/output interface 1150 via a bus 1160.

The CPU 1110 is an example of a general-purpose processor. The RAM 1120 is used as a working memory for the CPU 1110. The RAM 1120 includes a volatile memory such as a synchronous dynamic random-access memory (SDRAM). The program memory 1130 stores therein various programs including a parameter update processing program, for example. As the program memory 1130, for example, a read-only memory (ROM), a part of the auxiliary storage device 1140, or a combination thereof is used. The auxiliary storage device 1140 stores therein data non-temporarily. The auxiliary storage device 1140 includes a non-volatile memory such as an HDD or an SSD.

The input/output interface 1150 is an interface for establishing a connection with another device. The input/output interface 1150 is used, for example, for establishing a connection with a sound collecting device and an output device.

Each program stored in the program memory 1130 includes computer-executable instructions. When the program is executed by the CPU 1110, the program (computer-executable instructions) causes the CPU 1110 to execute predetermined processing. For example, when the class identifying processing program or the like is executed by the CPU 1110, the class identifying processing program or the like causes the CPU 1110 to execute the series of processing explained above concerning the units illustrated in FIGS. 2, 7, and 9.

The program may be provided to the computer 1100 in a manner stored in a computer-readable storage medium. In such a case, for example, the computer 1100 further includes a drive (not illustrated) that reads data from the storage medium, and acquires the program from the storage medium. Examples of the storage medium include a magnetic disk, an optical disc (e.g, a CD-ROM, a CD-R, a DVD-ROM, or a DVD-R), a magneto-optical disc (e.g., an MO disc), and a semiconductor memory. In addition, the program may be stored in a server on a communication network, and the computer 1100 may download the program from the server using the input/output interface 1150.

The processing described in the embodiments are not limited to those resultant of causing a general-purpose hardware processor such as the CPU 1110 to execute a program, and may also be performed by a dedicated hardware processor such as an application-specific integrated circuit (ASIC). The term "processing circuitry (processing unit)" includes at least one general-purpose hardware processor, at least one application-specific hardware processor, or a combination of at least one general purpose hardware processor and at least one application-specific hardware processor. In the example illustrated in FIG. 11, the CPU 1110, the RAM 1120, and the program memory 1130 correspond to the processing circuitry.

Therefore, according to each of the above embodiments, the identification precision of the neural network used for class identification can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition apparatus comprising:
   processing circuitry configured to:
     receive sensor data from a sensor;
     generate, using a feature quantity extracting neural network, a first feature quantity exhibiting a feature of the sensor data based on the sensor data;
     convert, using a feature quantity converting neural network, the first feature quantity into a second feature quantity exhibiting a feature contributing to identification of a class of the sensor data;
     generate, using an adjustment neural network, a generic feature quantity having a same number of filters as the second feature quantity based on the first feature quantity;
     calculate a feature quantity significance by multiplying the generic feature quantity with the second feature quantity;
     generate a significant feature quantity exhibiting a feature that is significant in the identification of the class based on a cross-correlation between the first feature quantity and the second feature quantity, by multiplying the generic feature quantity with the feature quantity significance;

generate an integrated feature quantity considering features of the first feature quantity and the second feature quantity, based on the second feature quantity and the significant feature quantity; and identify, using a recurrent neural network, the class based on the integrated feature quantity.

2. The recognition apparatus according to claim 1, wherein the processing circuitry is further configured to generate the first feature quantity by at least one of fusing feature quantities with respect to a type of the sensor data and fusing feature quantities with respect to a body part where the sensor is worn.

3. The recognition apparatus according to claim 1, wherein the processing circuitry is further configured to, in converting the first feature quantity into the second feature quantity, make number of classes to be identified same as number of filters.

4. The recognition apparatus according to claim 3, wherein the processing circuitry is further configured to, in converting the first feature quantity into the second feature quantity, activate the classes assigned to the respective filters.

5. The recognition apparatus according to claim 1, wherein the processing circuitry is further configured to generate the feature quantity significance with a feature element including at least a frequency feature of sensor data and also including at least one of time, a type of the sensor data, and a body part where the sensor is worn as a unit.

6. The recognition apparatus according to claim 1, wherein the processing circuitry is further configured to generate the integrated feature quantity by adding or multiplying the second feature quantity and the significant feature quantity.

7. The recognition apparatus according to claim 1, wherein the processing circuitry is further configured to identify the class using a past identification result.

8. The recognition apparatus according to claim 1, wherein the processing circuitry is further configured to identify an activity of a sensor wearer.

9. The recognition apparatus according to claim 1, wherein the processing circuitry is further configured to identify a class for entirety of the sensor data based on the second feature quantity.

10. The recognition apparatus according to claim 1, further comprising a memory that stores therein information related to a neural network model implementing each function of the processing circuitry.

11. The recognition apparatus according to claim 10, wherein the processing circuitry is further configured to switch at least one of the neural network model and a parameter of the neural network model.

12. The recognition apparatus according to claim 10, wherein the processing circuitry is further configured to train the neural network model.

13. The recognition apparatus according to claim 12, wherein the processing circuitry is further configured to train the neural network model in such a manner that a distribution of class identification likelihoods output based on the second feature quantity becomes equal to a distribution of class identification likelihoods output based on the integrated feature quantity.

14. The recognition apparatus according to claim 12, wherein the processing circuitry is further configured to update the neural network model using a training result.

15. The recognition apparatus according to claim 14, wherein the processing circuitry is further configured to store the training result in the memory.

16. The recognition apparatus according to claim 1, wherein the sensor is a wearable sensor.

17. The recognition apparatus according to claim 16, wherein the sensor data represents a physical activity of a sensor wearer.

18. The recognition apparatus according to claim 1, wherein the sensor data is received via a wired or wireless network.

19. A recognition method comprising:

receiving sensor data from a sensor;

generating, using a feature quantity extracting neural network, a first feature quantity exhibiting a feature of the sensor data based on the sensor data;

converting, using a feature quantity converting neural network, the first feature quantity into a second feature quantity exhibiting a feature contributing to identification of a class of the sensor data;

generating, using an adjustment neural network, a generic feature quantity having a same number of filters as the second feature quantity based on the first feature quantity;

calculating a feature quantity significance by multiplying the generic feature quantity with the second feature quantity;

generating a significant feature quantity exhibiting a feature that is significant in the identification of the class based on a cross-correlation between the first feature quantity and the second feature quantity, by multiplying the generic feature quantity with the feature quantity significance;

generating an integrated feature quantity considering features of the first feature quantity and the second feature quantity, respectively, based on the second feature quantity and the significant feature quantity; and identifying, by using a recurrent neural network, the class based on the integrated feature quantity.

20. A non-transitory computer-readable storage medium storing a program for causing a computer to execute processing comprising:

receiving sensor data from a sensor;

generating, using a feature quantity extracting neural network, a first feature quantity exhibiting a feature of the sensor data based on the sensor data;

converting, using a feature quantity converting neural network, the first feature quantity into a second feature quantity exhibiting a feature contributing to identification of a class of the sensor data;

generating, using an adjustment neural network, a generic feature quantity having a same number of filters as the second feature quantity based on the first feature quantity by;

calculating a feature quantity significance by multiplying the generic feature quantity with the second feature quantity;

generating a significant feature quantity exhibiting a feature that is significant in the identification of the class based on a cross-correlation between the first feature quantity and the second feature quantity, by multiplying the generic feature quantity with the feature quantity significance;

generating an integrated feature quantity considering features of the first feature quantity and the second feature quantity, respectively, based on the second feature quantity and the significant feature quantity; and identifying, using a recurrent neural network, the class based on the integrated feature quantity.

\* \* \* \* \*